(12) United States Patent
Shechtman et al.

(10) Patent No.: US 12,473,915 B2
(45) Date of Patent: Nov. 18, 2025

(54) APPARATUS AND METHOD FOR MECHANICALLY COUPLING A MOTOR TO A ROTOR OF A PROGRESSIVE CAVITY PUMP

(71) Applicant: JOHNSON & JOHNSON SURGICAL VISION, INC., Irvine, CA (US)

(72) Inventors: Alexander Shechtman, Haifa (IL); Ilya Sitnitsky, Nahariya (IL); Assaf Govari, Haifa (IL); Stanislav Katzir, Hadera (IL); Elad Avraham Diukman, Haifa (IL)

(73) Assignee: Johnson & Johnson Surgical Vision, Inc., Irvine, CA (US)

( * ) Notice: Subject to any disclaimer, the term of this patent is extended or adjusted under 35 U.S.C. 154(b) by 290 days.

(21) Appl. No.: 17/977,210

(22) Filed: Oct. 31, 2022

(65) Prior Publication Data
US 2024/0139028 A1    May 2, 2024

(51) Int. Cl.
*F04C 15/00*    (2006.01)
*F04B 39/14*    (2006.01)
*F04B 53/22*    (2006.01)

(52) U.S. Cl.
CPC .......... *F04C 15/0073* (2013.01); *F04B 39/14* (2013.01); *F04B 53/22* (2013.01); *Y10T 403/7032* (2015.01)

(58) Field of Classification Search
CPC ...... F04B 39/14; F04B 53/22; F04C 15/0073; Y10T 403/602; Y10T 403/7032; F16D 3/202–207

(Continued)

(56) References Cited

U.S. PATENT DOCUMENTS

| 2,140,737 A | 12/1938 | Griffith |
| 2,815,838 A | 12/1957 | Dodge |

(Continued)

FOREIGN PATENT DOCUMENTS

| CN | 209370050 U | 9/2019 |
| CN | 111609054 A | 9/2020 |

(Continued)

OTHER PUBLICATIONS

U.S. Appl. No. 17/318,665, Entitled "Disposable Pump Cartridge", filed May 12, 2021.

*Primary Examiner* — Alexander B Comley

(57) ABSTRACT

An apparatus includes a proximal shaft configured to mechanically couple to a motor, a first universal joint, a middle shaft coupled to the proximal shaft via the first universal joint, a housing having a bore, a second universal joint within the bore, a distal shaft coupled to the middle shaft via the second universal joint, and a connector disposed over the distal shaft. The bore limits a downward tilt of the distal shaft such that, as a rotor approaches the distal shaft, the distal shaft becomes axially aligned with the rotor by virtue of the proximal end of the rotor entering the connector or vice versa. A spring connected proximally to the connector and distally to the second universal joint is configured to decompress, thereby reversibly coupling the connector to the proximal end of the rotor, upon the motor rotationally aligning the connector with the proximal end of the rotor.

6 Claims, 8 Drawing Sheets

(58) Field of Classification Search
USPC ...... 403/359.4, 327; 464/114; 417/359, 360, 417/423.6
See application file for complete search history.

(56) References Cited

U.S. PATENT DOCUMENTS

| | | | | |
|---|---|---|---|---|
| 2,872,225 | A * | 2/1959 | Walker, Jr. | F01C 17/06 464/88 |
| 3,174,598 | A | 3/1965 | Mattson | |
| 4,204,411 | A * | 5/1980 | Jeanson | F16C 1/04 180/14.1 |
| 4,386,654 | A * | 6/1983 | Becker | F04C 11/003 166/105.5 |
| 4,714,803 | A | 12/1987 | Lederman | |
| 4,990,070 | A * | 2/1991 | Maruyama | F04C 13/001 418/48 |
| 5,085,564 | A * | 2/1992 | Naylor | F16D 1/033 464/181 |
| 5,246,414 | A | 9/1993 | Hallbach | |
| 5,288,271 | A * | 2/1994 | Nelson | F16D 3/265 464/147 |
| 5,295,788 | A | 3/1994 | Tajime et al. | |
| 5,421,780 | A | 6/1995 | Vukovic | |
| 5,499,969 | A | 3/1996 | Beuchat et al. | |
| 5,501,580 | A * | 3/1996 | Barrus | F04C 15/0065 166/107 |
| 5,643,302 | A | 7/1997 | Beiser et al. | |
| 5,752,813 | A | 5/1998 | Tyner et al. | |
| 6,000,512 | A | 12/1999 | Cronin et al. | |
| 6,006,881 | A | 12/1999 | Lederman et al. | |
| 6,158,996 | A | 12/2000 | Becher | |
| 6,170,625 | B1 | 1/2001 | Tanaka | |
| 7,070,578 | B2 | 7/2006 | Leukanech et al. | |
| 7,588,385 | B2 * | 9/2009 | Sugata | F16D 11/14 399/167 |
| 7,779,987 | B2 | 8/2010 | Swinderman | |
| 7,827,570 | B2 | 11/2010 | Suzuki | |
| 8,986,252 | B2 | 3/2015 | Cummings et al. | |
| 9,006,148 | B2 | 4/2015 | Zar | |
| 9,033,940 | B2 | 5/2015 | Muri et al. | |
| 9,445,943 | B2 | 9/2016 | Wilson et al. | |
| 9,447,665 | B2 * | 9/2016 | Morrow | E21B 43/126 |
| 9,603,990 | B2 | 3/2017 | Woolford | |
| 9,962,226 | B2 | 5/2018 | Brennan et al. | |
| 10,280,683 | B1 * | 5/2019 | Smid | F04C 15/0076 |
| 10,288,065 | B1 * | 5/2019 | Smid | F16D 3/205 |
| 10,688,272 | B2 | 6/2020 | Burgess et al. | |
| 10,704,351 | B2 | 7/2020 | Haugland | |
| 11,371,502 | B2 | 6/2022 | Muckley et al. | |
| 2001/0011623 | A1 | 8/2001 | Ogata et al. | |
| 2001/0055528 | A1 * | 12/2001 | Mills | F04C 14/06 417/900 |
| 2005/0049621 | A1 | 3/2005 | Feingold et al. | |
| 2005/0118048 | A1 | 6/2005 | Traxinger | |
| 2006/0083637 | A1 * | 4/2006 | Marielle | F01C 17/06 417/410.3 |
| 2008/0078647 | A1 | 4/2008 | Watanabe et al. | |
| 2010/0297193 | A1 | 11/2010 | Archambeau et al. | |
| 2011/0137231 | A1 | 6/2011 | Sorensen et al. | |
| 2012/0039734 | A1 * | 2/2012 | Sakakihara | F04C 13/008 418/48 |
| 2012/0063941 | A1 * | 3/2012 | Overmeier | F16D 1/02 418/48 |
| 2013/0048384 | A1 | 2/2013 | Jarvis et al. | |
| 2013/0092493 | A1 | 4/2013 | Hsueh | |
| 2013/0267894 | A1 | 10/2013 | Woolford et al. | |
| 2014/0163455 | A1 | 6/2014 | Wilson et al. | |
| 2014/0227121 | A1 * | 8/2014 | Parrett | F04C 15/0073 464/24 |
| 2014/0311730 | A1 * | 10/2014 | Morrow | F04C 2/1071 166/68.5 |
| 2016/0074565 | A1 | 3/2016 | Giordano et al. | |
| 2017/0128859 | A1 | 5/2017 | Levitt et al. | |
| 2017/0246602 | A1 * | 8/2017 | Dean | B01F 35/10 |
| 2018/0010612 | A1 | 1/2018 | Wegener et al. | |
| 2019/0159830 | A1 | 5/2019 | Horner et al. | |
| 2019/0210489 | A1 | 7/2019 | Sato | |
| 2019/0247050 | A1 | 8/2019 | Goldsmith | |
| 2019/0365567 | A1 | 12/2019 | Balkenbush et al. | |
| 2020/0200313 | A1 | 6/2020 | Chu et al. | |
| 2021/0095674 | A1 | 4/2021 | Lu et al. | |
| 2021/0172438 | A1 * | 6/2021 | Agostini | F04C 15/0073 |
| 2022/0186792 | A1 | 6/2022 | Robert et al. | |
| 2022/0241487 | A1 | 8/2022 | Sussman | |
| 2022/0308517 | A1 * | 9/2022 | Takagi | F16D 3/06 |
| 2022/0362056 | A1 | 11/2022 | Algawi et al. | |
| 2022/0362453 | A1 | 11/2022 | Algawi et al. | |
| 2022/0395395 | A1 | 12/2022 | Govari et al. | |

FOREIGN PATENT DOCUMENTS

| | | | |
|---|---|---|---|
| DE | 312191 C | 12/1917 | |
| DE | 3205222 A1 * | 8/1983 | |
| DE | 3816581 C * | 9/1989 | .......... F04C 15/0073 |
| DE | 4031360 A * | 1/1992 | .......... F04C 15/0073 |
| DE | 9312700 U1 | 11/1993 | |
| DE | 19530978 A1 * | 2/1997 | ............ F04C 2/1071 |
| DE | 10116641 A1 * | 10/2002 | .......... F04C 15/0073 |
| DE | 102007031722 A1 | 1/2009 | |
| DE | 102016124241 A1 | 6/2018 | |
| DE | 102018102640 A1 * | 8/2019 | .......... F04C 15/0038 |
| GB | 2305470 A * | 4/1997 | ............. F04C 11/00 |
| JP | 60142078 A * | 7/1985 | |
| JP | H09177807 A * | 7/1997 | |
| JP | 2764292 B2 * | 6/1998 | |
| JP | H10252767 A * | 9/1998 | |
| JP | 2002031153 A * | 1/2002 | |
| JP | 2007139084 A * | 6/2007 | |
| JP | 2017207565 A * | 11/2017 | |
| WO | 8903230 A1 | 4/1989 | |
| WO | 2014113384 A2 | 7/2014 | |
| WO | WO-2016013504 A1 * | 1/2016 | .............. F04C 15/00 |
| WO | 2020160434 A1 | 8/2020 | |
| WO | WO-2021044440 A1 * | 3/2021 | .......... F04C 15/0034 |
| WO | 2021001742 A1 | 7/2021 | |

* cited by examiner

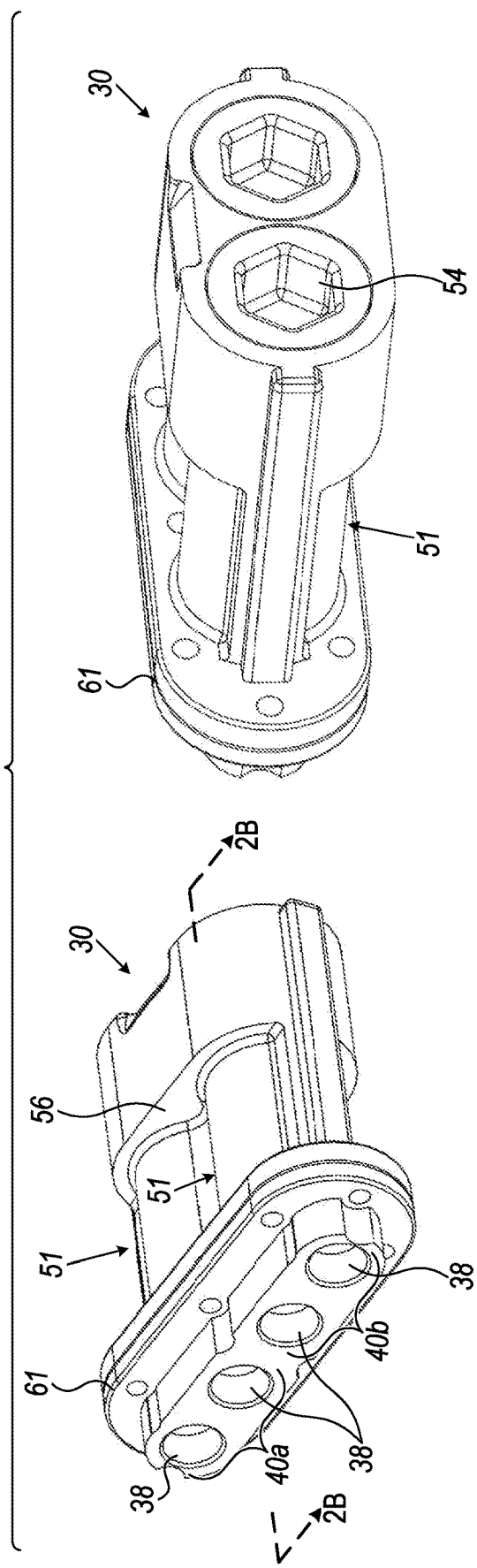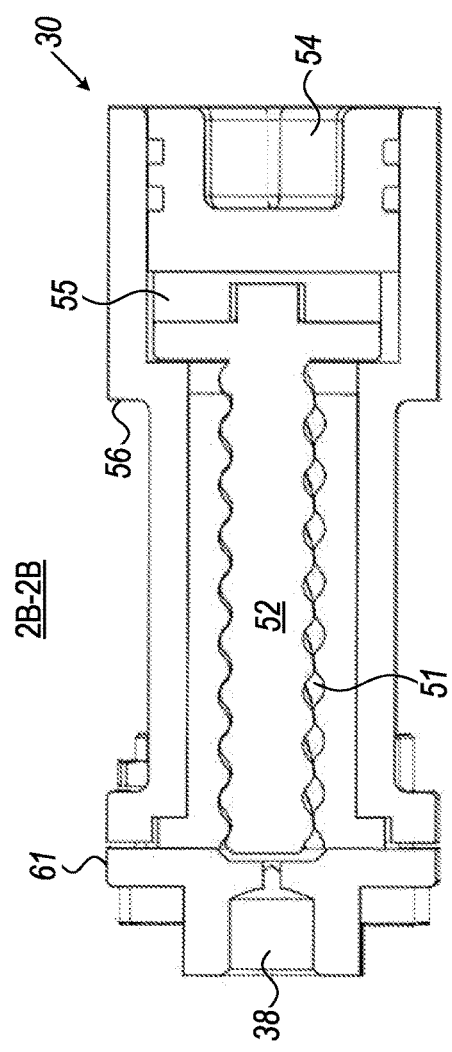

APPARATUS AND METHOD FOR MECHANICALLY COUPLING A MOTOR TO A ROTOR OF A PROGRESSIVE CAVITY PUMP

FIELD OF THE DISCLOSURE

The present disclosure is related generally to the field of eye surgery, and particularly to phacoemulsification procedures.

BACKGROUND

During a phacoemulsification procedure, the lens of an eye is emulsified by ultrasonic waves.

BRIEF DESCRIPTION OF THE DRAWINGS

The present disclosure will be more fully understood from the following detailed description of examples thereof, taken together with the drawings, in which:

FIG. 2A schematically shows a cartridge from two different perspectives, in accordance with some examples of the present disclosure;

FIG. 2B schematically shows a longitudinal cross section through a cartridge, in accordance with some examples of the present disclosure;

DETAILED DESCRIPTION OF EXAMPLES

Overview

During a phacoemulsification procedure, fluids are pumped in and out of the eye. One type of pump that may be particularly effective for this purpose is a progressive cavity pump, which comprises a rotor rotatably disposed inside a stator. However, such a pump may be difficult or impossible to sterilize after use, and repeatedly replacing the entire pump apparatus, including any motors, may be prohibitively expensive.

To address this challenge, examples of the present disclosure provide a disposable cartridge comprising two progressive cavity pumps: one pump for pumping fluid to the eye, and another pump for pumping fluid from the eye. The cartridge is inserted into a base, which comprises a pair of motors and a mechanical coupling mechanism for mechanically coupling the motors to the pumps so that the motors can rotate the rotors of the pumps. Advantageously, following the phacoemulsification procedure, the relatively inexpensive cartridge may be ejected from the base (e.g., by pushing a button or by activating any other ejection mechanism) and then discarded, while the base may be reused for the next procedure without necessarily requiring any prior cleaning.

In examples of the present disclosure, the mechanical coupling mechanism comprises, for each motor, a proximal shaft, a middle shaft, and a distal shaft. Respective universal joints couple the proximal shaft to the middle shaft and the middle shaft to the distal shaft. The proximal end of the proximal shaft is mechanically coupled to the motor (e.g., via gears and/or other components), and a connector disposed over the distal shaft is configured to reversibly couple to one of the rotors in the cartridge upon insertion of the cartridge. Each of the universal joints allows rotation about two axes perpendicular to one another and to the proximal-distal axis of the shafts. Thus, as the motors turn the proximal shafts, the distal shafts—and hence, the rotors—rotate eccentrically (i.e., rotate about a revolving axis of rotation) by virtue of the universal joints, such that the rotors force fluid from the stators.

System Description

Figure 1:
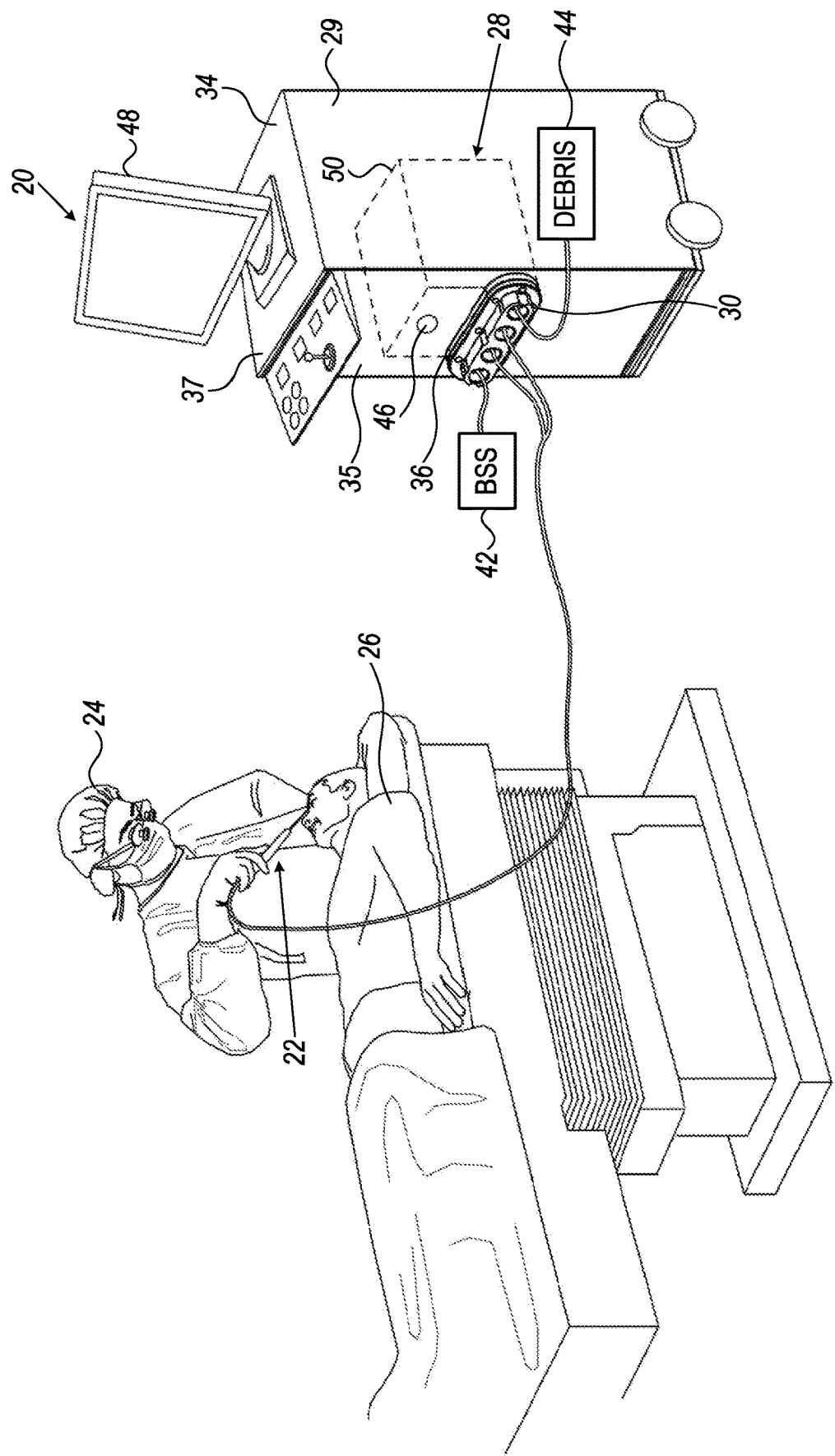
FIG. 1 is a schematic illustration of a phacoemulsification system, in accordance with some examples of the present disclosure.

Reference is initially made to FIG. 1, which is a schematic illustration of a phacoemulsification system 20, in accordance with some examples of the present disclosure.

System 20 comprises a phacoemulsification probe 22, with which a physician 24 may perform a phacoemulsification procedure on an eye of a subject 26. In particular, physician 24 may position the distal tip of probe 22 near or against the lens of the eye. Subsequently, the physician may cause an ultrasonic transducer at the distal tip of the probe to emit ultrasonic waves at the lens, thus causing phacoemulsification of the lens.

System 20 further comprises a pumping apparatus 28, which is described in detail below with reference to the subsequent figures. As the phacoemulsification procedure is performed, pumping apparatus 28 aspirates debris (including pieces of the lens) from the eye while maintaining a flow of an irrigating fluid, such as a balanced salt solution (BSS), to the eye so as to maintain the intraocular pressure in the eye.

More specifically, pumping apparatus 28 comprises a cartridge 30, comprising two positive displacement pumps, and a base 50, comprising two motors. Prior to the procedure, cartridge 30 is inserted into base 50, thereby mechanically coupling each pump to a respective one of the motors. One of the pumps, driven by one of the motors, pumps fluid from a reservoir 42 to the distal end of the probe. The other pump, driven by the other motor, pumps fluid and debris from the eye to a collection container 44.

Typically, base 50 is disposed within, or is an integrated part of, a console 34, and cartridge 30 is inserted into the base through a slot 36 in a side panel 35 or top panel 37 of console 34. Following the procedure, the cartridge is removed from the base, e.g., by pushing a button 46 as further described below, for example, with reference to FIG. 5. Typically, the cartridge is then disposed of, and another cartridge is used for the next procedure.

Alternatively, base 50 may be disposed within probe 22, e.g., at or near the portion of probe 22 that is grasped by physician 24.

In some examples, system 20 further comprises a display 48. System 20 may further comprise a processor 29 and/or other circuitry (not shown), configured to drive the ultrasonic transducer at the tip of probe 22, control pumping apparatus 28, display relevant information on display 48, and/or perform any other relevant function.

The Pumping Apparatus

A more detailed description of cartridge 30 is hereby provided with reference to FIG. 2A, which schematically shows cartridge 30 from two different perspectives, and FIG. 2B, which schematically shows a longitudinal cross section through the cartridge, in accordance with some examples of the present disclosure.

Cartridge 30 is shaped to define two stators 51 and respective pairs of ports 38 in fluidic communication with stators 51. Ports 38 may be disposed, for example, at the front of the cartridge. Stators 51 may be metallic or polymeric.

The cartridge further comprises two rotors 52 rotatably disposed, respectively, within the stators. (The cross section in FIG. 2B is taken through one of the stators, so as to reveal the rotor 52 disposed therein.) Rotors 52 may be metallic or polymeric.

As described above with reference to FIG. 1, typically, one pair 40a of ports 38 is connected to reservoir 42 and to the probe, while the other pair 40b of ports is connected to the probe and to collection container 44. Thus, rotation of the rotors within the stators causes (i) fluid to flow from reservoir 42, through pair 40a, to the distal tip of probe 22, and (ii) fluid and debris to flow from the eye, through pair 40b, to collection container 44.

In some examples, each rotor comprises a hexagonal female connector 54 coupled to an Oldham coupling mechanism 55, which facilitates the eccentric rotation of the rotor. (Such examples are described in U.S. application Ser. No. 17/318,665, whose disclosure is incorporated herein by reference.) Other examples are described below with reference to FIGS. 6-7.

In some examples, the outer surface of the cartridge is shaped to define a ridge 56, which may facilitate coupling the cartridge to base 50 (FIG. 1).

In some examples, cartridge 30 comprises a front panel 61, which, by virtue of being fastened to the remainder of the cartridge (e.g., via screws), stabilizes stators 51 and prevents leakage from the cartridge. Front panel 61 may be grasped when inserting the cartridge into, or removing the cartridge from, the base. Alternatively or additionally, cartridge 30 may comprise a handle, which may be grasped when inserting or removing the cartridge.

Figure 3A:
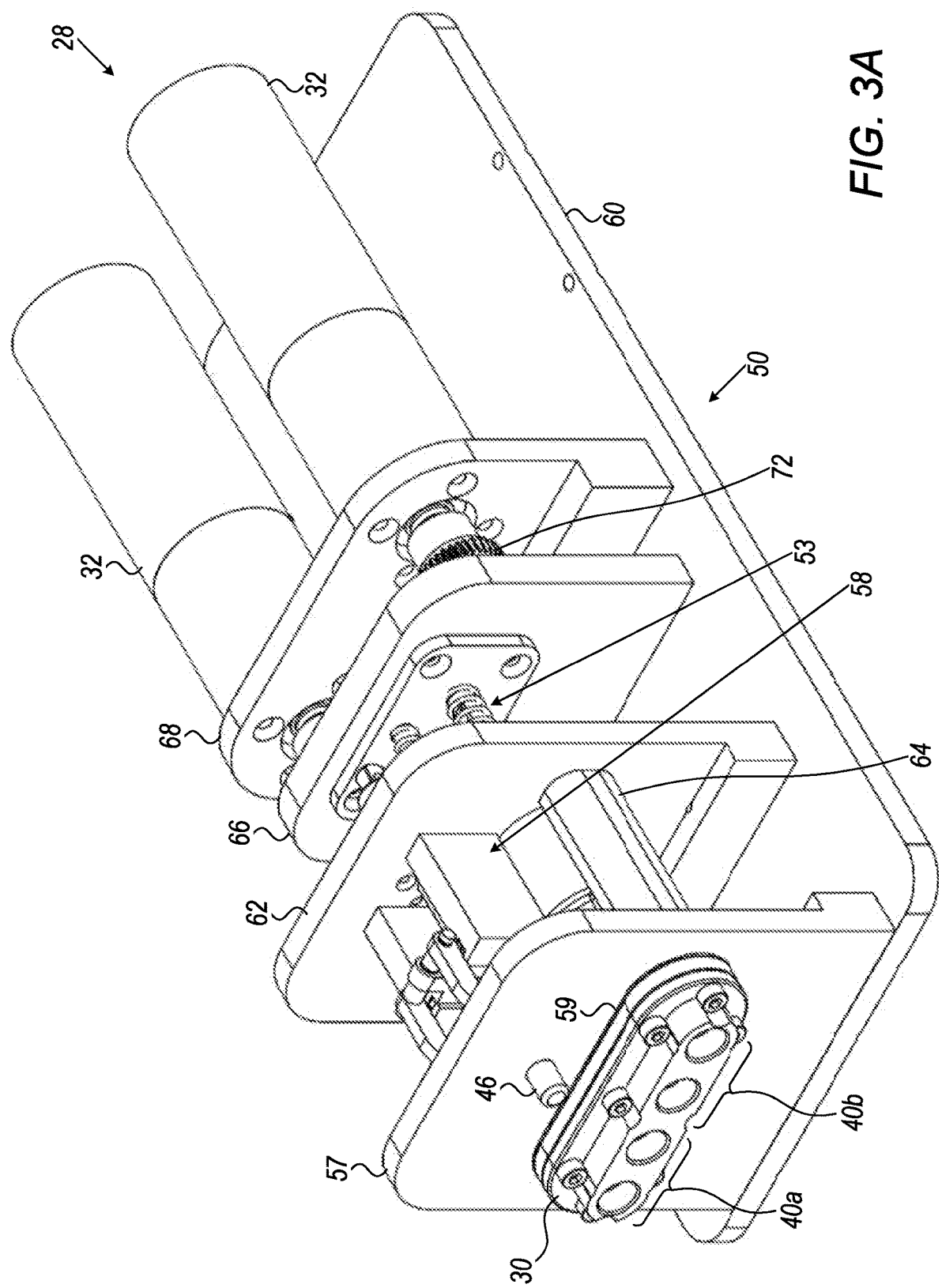
FIGS. 3A-B schematically show a pumping apparatus from two different perspectives, in accordance with some examples of the present disclosure.
Figure 3B:
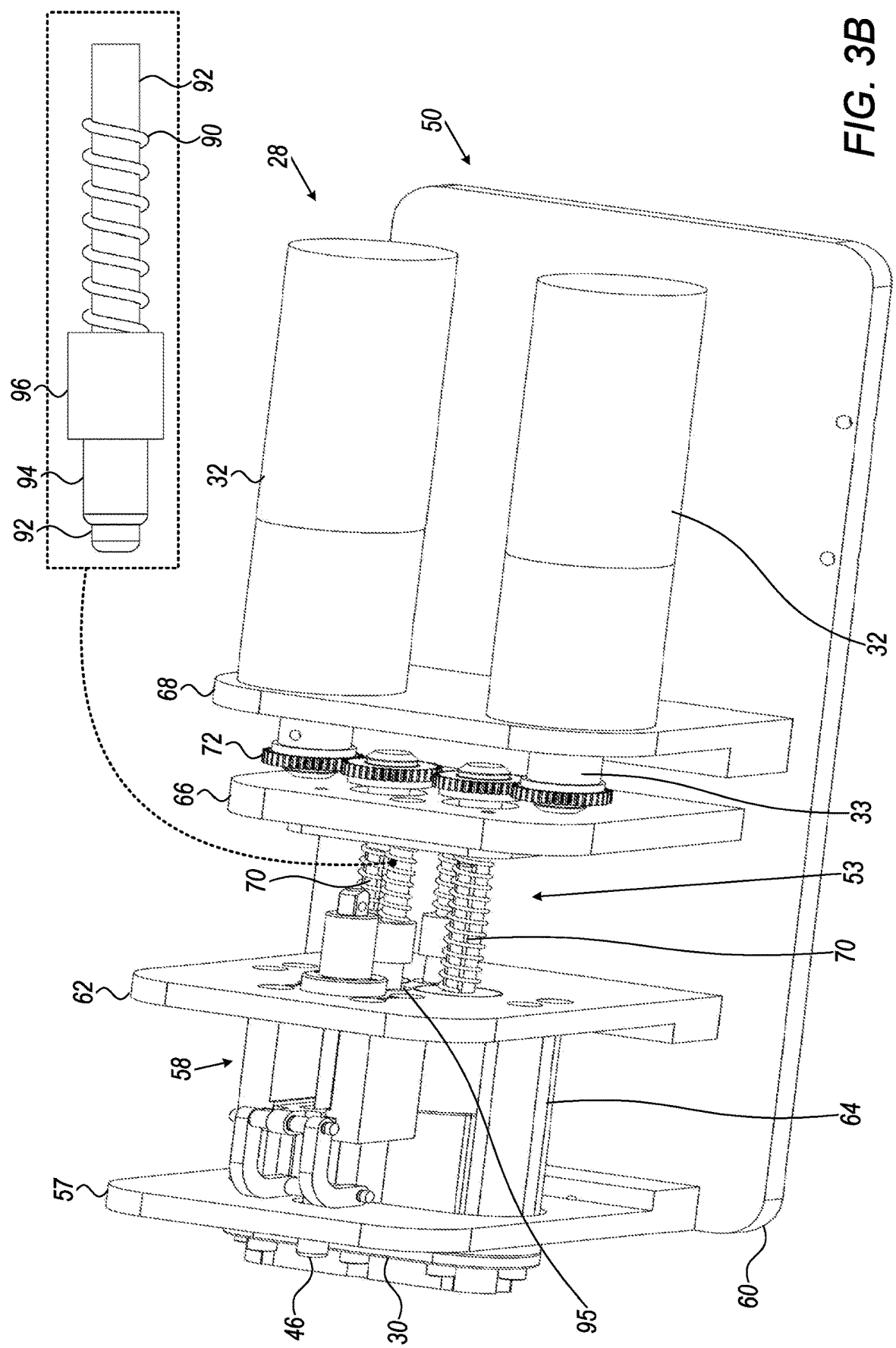

Other features of the pumping apparatus are hereby described with reference to FIGS. 3A-B, which schematically show the pumping apparatus from two different perspectives, in accordance with some examples of the present disclosure.

As noted above with reference to FIG. 1, pumping apparatus 28 comprises a base 50, into which cartridge 30 is inserted. For example, the base may be shaped to define a slot 59, and the cartridge may be inserted into (and removed from) the base by virtue of being slid through slot 59.

In some examples, a front face 57 of the base is shaped to define slot 59. In such examples, the base may be disposed inside console 34 (FIG. 1), with front face 57 situated behind side panel 35 or top panel 37 of the console such that slot 59 is aligned with slot 36 of the console. Thus, as described above with reference to FIG. 1, the cartridge may be inserted into (and removed from) the base through slot 36.

Typically, base 50 comprises a lock, configured to lock the cartridge in place upon the insertion of the cartridge. The example of lock 58 shown in FIGS. 3A-B is described in U.S. application Ser. No. 17/318,665, whose disclosure is incorporated herein by reference. Another example is described below with reference to FIG. 5.

Typically, the base further comprises button 46, which is configured to release lock 58 upon a pushing of the button. In some examples, button 46 protrudes through a hole in front face 57. This hole may be aligned with a hole in side panel 35 or top panel 37 of the console, such that, as illustrated in FIG. 1, the button protrudes from the console.

In other examples, the base is an integrated part of console 34, such that the base need not comprise front face 57. Rather, cartridge 30 may be inserted into the base directly through slot 36 (FIG. 1), and button 46 may protrude directly through side panel 35 or top panel 37 of the console.

Base 50 comprises two motors 32 and a mechanical coupling mechanism 53. Mechanical coupling mechanism 53 is configured to mechanically couple motors 32 to rotors 52 (FIG. 2B), such that the motors may rotate the rotors.

In some examples, mechanical coupling mechanism 53 comprises two shafts 70. Each shaft 70 is mechanically coupled at its back end to a different respective motor 32. Thus, each motor turns a different respective one of shafts 70, thereby causing the shaft to become mechanically coupled to a different respective rotor and to turn the rotor.

For example, shaft 70 may be directly coupled to motor 32, such that the shaft protrudes from the motor and is rotated directly by torque generated by the motor. Alternatively, as shown in FIGS. 3A-B, shaft 70 may be indirectly coupled to motor 32; for example, the shaft may be mechanically coupled, via gears 72, to another shaft 33 directly coupled to the motor.

Other examples of mechanical coupling mechanism 53 are described below with reference to FIGS. 5-7.

In some examples, base 50 further comprises a first panel 62. In such examples, tracks 64 may run between front face 57 and first panel 62, and cartridge 30 may slide along tracks 64. First panel 62 may further facilitate the operation of lock 58, as described with reference to FIG. 4 of U.S. application Ser. No. 17/318,665, whose disclosure is incorporated herein by reference.

Alternatively or additionally, base 50 may further comprise a second panel 66, which may facilitate the operation of mechanical coupling mechanism 53, as described with reference to FIG. 5 of U.S. application Ser. No. 17/318,665, whose disclosure is incorporated herein by reference. Alternatively or additionally, base 50 may comprise a motor-supporting panel 68, to which the motors are fastened. Alternatively or additionally, base 50 may comprise a supporting panel 60, to which front face 57, first panel 62, second panel 66, and/or motor-supporting panel 68 are fastened.

Figure 4:
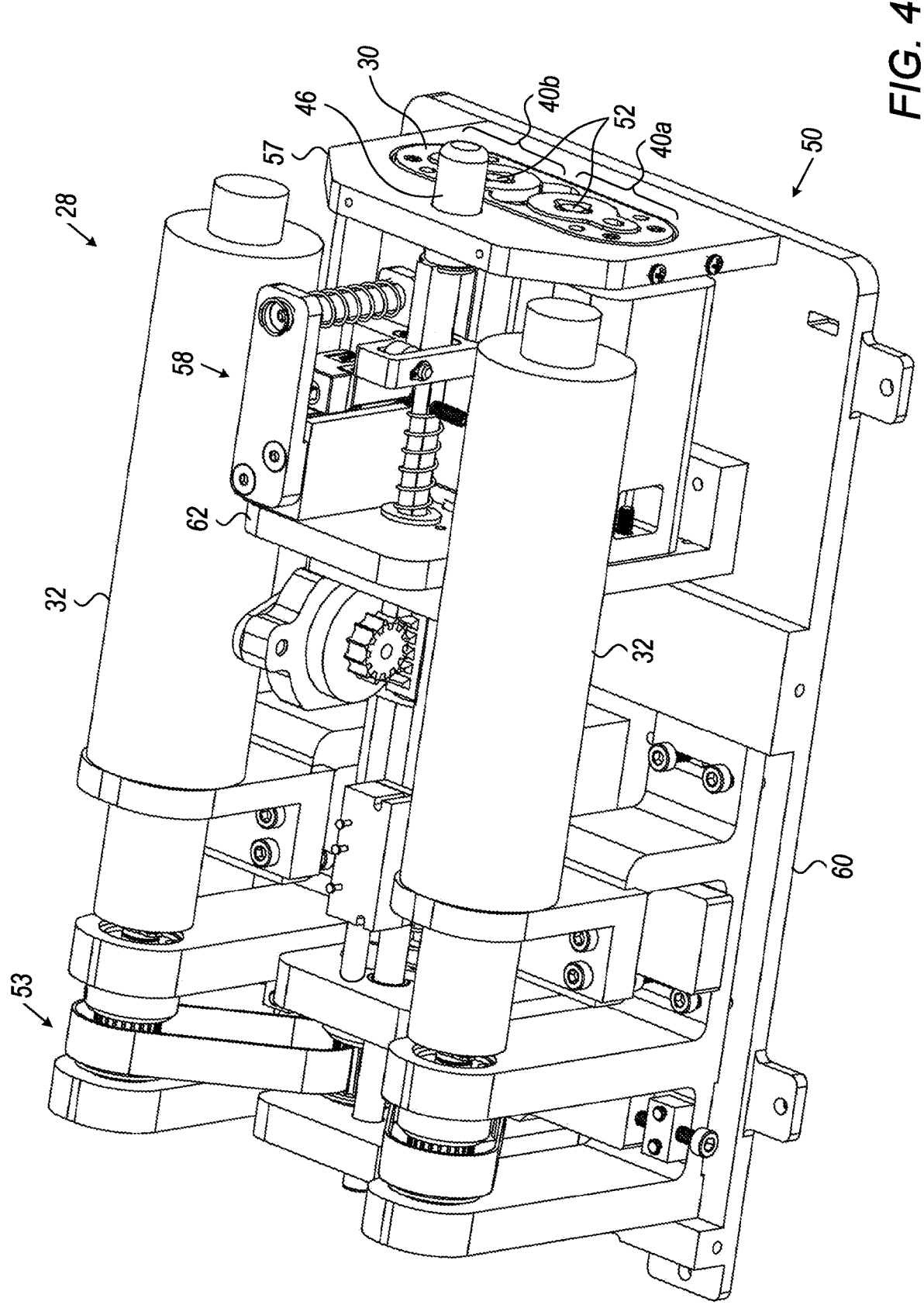
FIG. 4 is a schematic illustration of a pumping apparatus, in accordance with some examples of the present disclosure.

Reference is now made to FIG. 4, which is a schematic illustration of pumping apparatus 28, in accordance with some examples of the present disclosure. Reference is also made to FIG. 5, which shows the example of FIG. 4 with motors 32 and parts of mechanical coupling mechanism 53 hidden from view.

In some examples, base 50 (in particular, mechanical coupling mechanism 53) comprises two proximal shafts 110 mechanically coupled to motors 32, respectively. Base 50 further comprises two proximal-middle universal joints 112, and two middle shafts 114 coupled to proximal shafts 110, respectively, via proximal-middle universal joints 112. Base 50 further comprises two middle-distal universal joints 116, and two distal shafts 118 coupled to middle shafts 114, respectively, via middle-distal universal joints 116. (Middle-distal universal joints 116 are shown more fully in FIG. 6, which is described below.)

As described above, cartridge 30 is removably insertable into base 50. Following the insertion of the cartridge, as motors 32 turn proximal shafts 110, distal shafts 118 mechanically couple to rotors 52, respectively, and then rotate the rotors eccentrically so as to pump fluid through the pairs of ports, as further described below with reference to FIG. 6.

The motors may turn proximal shafts 110 directly or via other components of the mechanical coupling mechanism, including, for example, gears 120.

In some examples, lock 58 comprises a slidable member 122 and a compression spring 124. While the cartridge is within the base, spring 124 pushes slidable member 122 onto the cartridge, thereby locking the cartridge in place. As button 46 is pushed, a shaft 126 extending proximally from the button pushes the slidable member upward, such that the cartridge may be ejected, e.g., as described below.

Typically, base 50 comprises another compression spring 128. A proximal end of spring 128 is coupled to first panel 62, and a distal end of spring 128 is coupled to shaft 126 directly or via a stopper 129 coupled to the shaft. (Optionally, spring 128 may be coiled around the shaft.) As button 46 is pushed, spring 128 is compressed. Subsequently, after the pushing of the button ceases, spring 128 decompresses, thereby returning shaft 126 and button 46 to their default positions.

In some examples, another compression spring 130 ejects the cartridge. For example, as the cartridge is inserted into the base, the cartridge may push against a rod 132 coupled to spring 130, thereby compressing the spring. Following the release of the lock, spring 130 may push rod 132 distally, thereby pushing the cartridge from the base. In some examples, a position sensor 131, such as an inductive position sensor coupled to rod 132, outputs a signal indicating the position of rod 132 to processor 29 (FIG. 1), such that the processor may ascertain whether the cartridge has been inserted.

In some examples, a damper 134 slows the ejection of the cartridge.

In some such examples, damper 134 comprises a toothed plate 138 coupled to rod 132, and a toothed wheel 136. The teeth of wheel 136 engage with the teeth of plate 138 such that, as rod 132—and hence, plate 138—moves linearly, the wheel rotates. In particular, as the toothed plate moves proximally (away from the cartridge), toothed wheel 136 rotates in a first direction (clockwise per the perspective of FIG. 5). Conversely, as the toothed plate moves distally (toward the cartridge), toothed wheel 136 rotates in a second direction. Toothed wheel 136 is biased so as to provide greater resistance to rotation in the second direction, relative to the first direction, thereby slowing the ejection of the cartridge.

Figure 6:
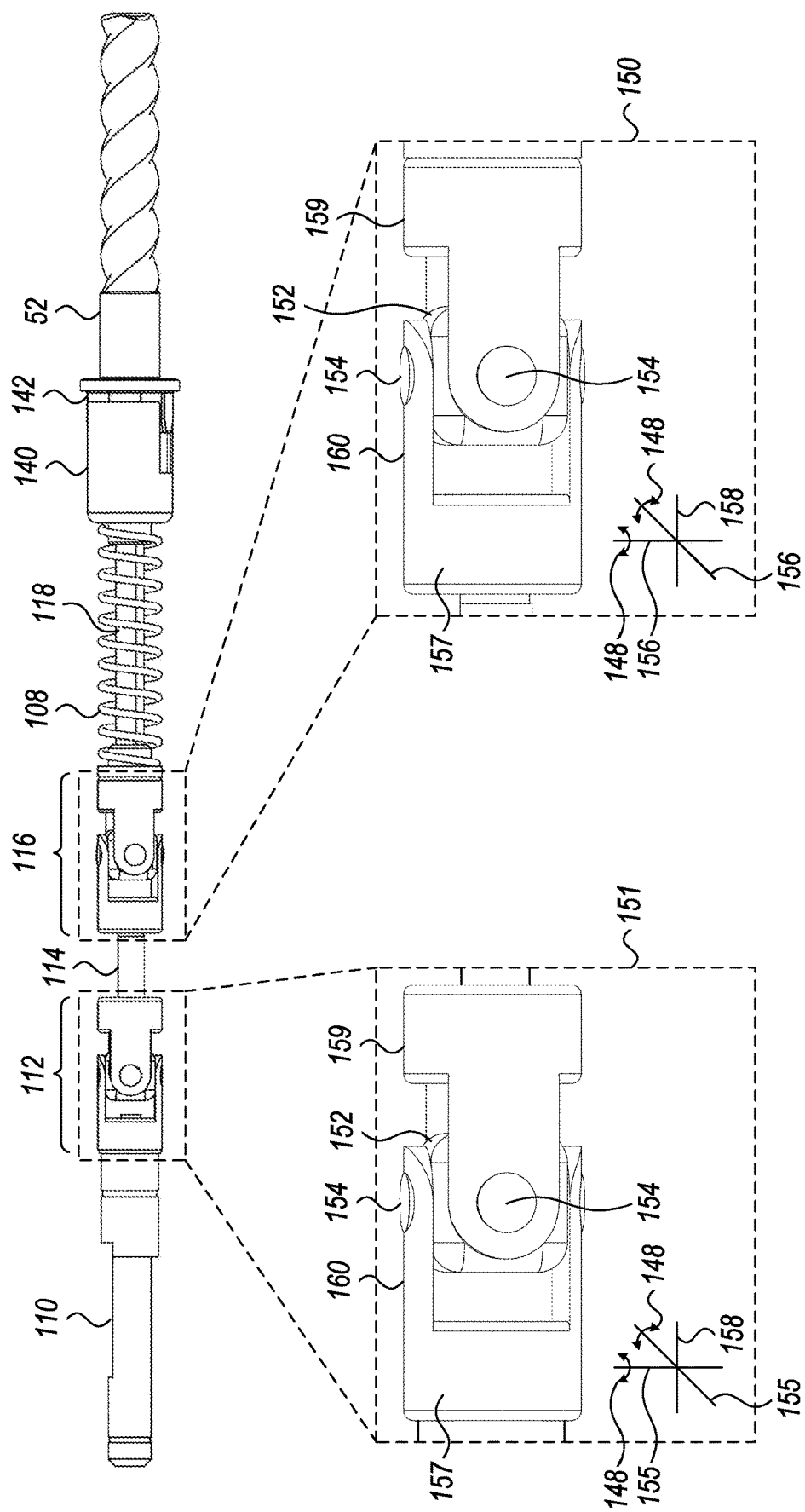
FIG. 6 is a schematic illustration of an apparatus for mechanically coupling a motor to a rotor of a progressive cavity pump, in accordance with some examples of the present disclosure.

Reference is now made to FIG. 6, which is a schematic illustration of an apparatus for mechanically coupling a motor 32 (FIG. 4) to a rotor 52 of a progressive cavity pump, in accordance with some examples of the present disclosure.

An inset portion 150 of FIG. 6 shows an expanded view of middle-distal universal joint 116 along with an axis diagram. As indicated by rotation indicators 148 in the axis diagram, middle-distal universal joint 116 is configured to allow rotation of distal shaft 118, with respect to middle shaft 114, about two axes 156 perpendicular to one another and to a proximal-distal axis 158. (As the middle shaft is rotated about proximal-distal axis 158 by the motor, axes 156 also rotate.)

Similarly, an inset portion 151 of FIG. 6 shows an expanded view of proximal-middle universal joint 112 along with another axis diagram. As indicated by rotation indicators 148, proximal-middle universal joint 112 is configured to allow rotation of middle shaft 114, with respect to proximal shaft 110, about another two axes 155 perpendicular to one another and to proximal-distal axis 158. (As the proximal shaft is rotated about proximal-distal axis 158 by the motor, axes 155 also rotate.) It is noted that the two universal joints may be rotationally offset about proximal-distal axis 158 with respect to one another, such that axes 155 are not necessarily parallel to axes 156.

Thus, advantageously, proximal-middle universal joint 112 and middle-distal universal joint 116 facilitate eccentric rotation of rotor 52.

In some examples, as shown in FIG. 6, middle-distal universal joint 116 comprises a bearing 152 comprising two pairs of opposing projections 154, each pair of projections 154 being aligned with a different respective axis 156. The middle-distal universal joint further comprises a more proximal swiveling element 157, which is coupled to the middle shaft, and a more distal swiveling element 159, which is coupled to the distal shaft. Each swiveling element may comprise two opposing arms 160, which are fit over a respective pair of projections 154 such that the swiveling element swivels about a respective one of axes 156.

In such embodiments, typically, proximal-middle universal joint 112 similarly comprises another bearing 152 comprising two pairs of opposing projections 154, each pair of projections being aligned with a different respective axis 155. The proximal-middle universal joint further comprises a more proximal swiveling element 157 coupled to the proximal shaft and a more distal swiveling element 159 coupled to the middle shaft. Each swiveling element may comprise two opposing arms 160, which are fit over a respective pair of projections 154 such that the swiveling element swivels about a respective one of axes 155.

As further described below with reference to FIG. 7, a slidable connector 140, which is slidably disposed over distal shaft 118, is configured to reversibly couple to proximal end 142 of rotor 52. A compression spring 108, which is connected proximally to slidable connector 140 and distally to middle-distal universal joint 116, facilitates this coupling. Typically, compression spring 108 is coiled around the distal shaft.

Figure 5:
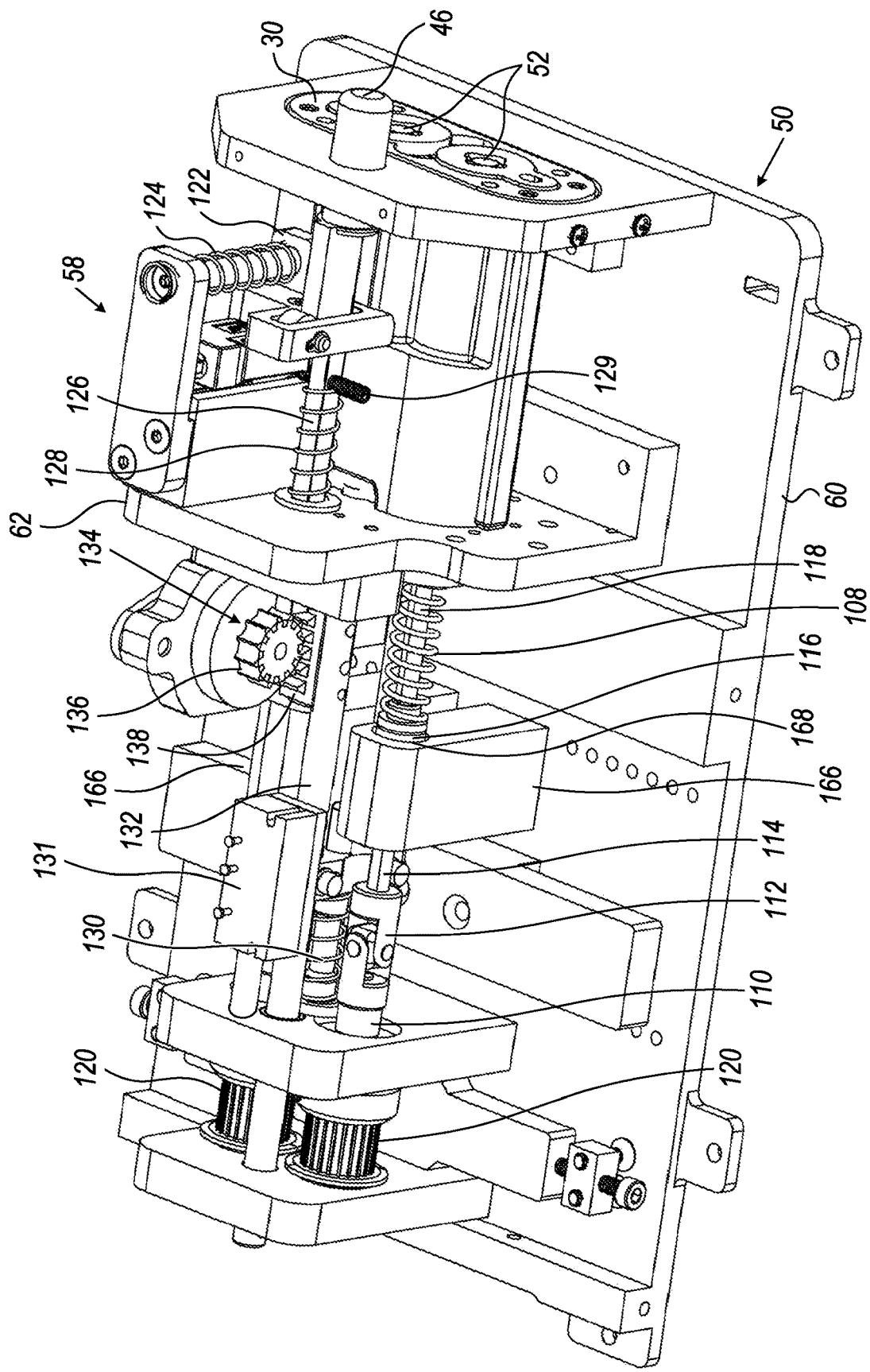
FIG. 5 is a schematic illustration of a portion of a pumping apparatus, in accordance with some examples of the present disclosure.

Reference is now additionally made to FIG. 5.

By way of introduction, it is noted that the middle-distal universal joints complicate the coupling of the distal shafts to the rotors, given that these joints allow the force of gravity to tilt the distal shafts downward. If this downward tilt is not constrained, the distal shafts may be entirely misaligned with the rotors upon insertion of the cartridge, and hence, may not couple to the rotors.

To address this challenge, base 50 further comprises two housings 166 shaped to define respective bores 168, within which the middle-distal universal joints are disposed. Bores 168 are sized to limit the downward tilt of distal shafts 118 (by limiting the rotation of the middle-distal universal joints) such that, as the rotors approach the distal shafts upon insertion of the cartridge, the distal shafts become axially aligned with the rotors by virtue of proximal ends 142 of the rotors entering slidable connectors 140 or the slidable connectors entering the proximal ends of the rotors, as further described below with reference to FIG. 7.

Nonetheless, to facilitate the eccentric rotation of the rotors, the diameter of each bore 168 is greater (e.g., at least 0.5 mm greater) than the diameter of each middle-distal universal joint 116. (Thus, the bores limit the downward tilt of the distal shafts as described above, but do not prevent this tilt entirely.) As a purely illustrative example, for a joint diameter of 10 mm and a radius of eccentricity of 0.5 mm, the diameter of each bore may be between 11 and 11.5 mm.

Figure 7:
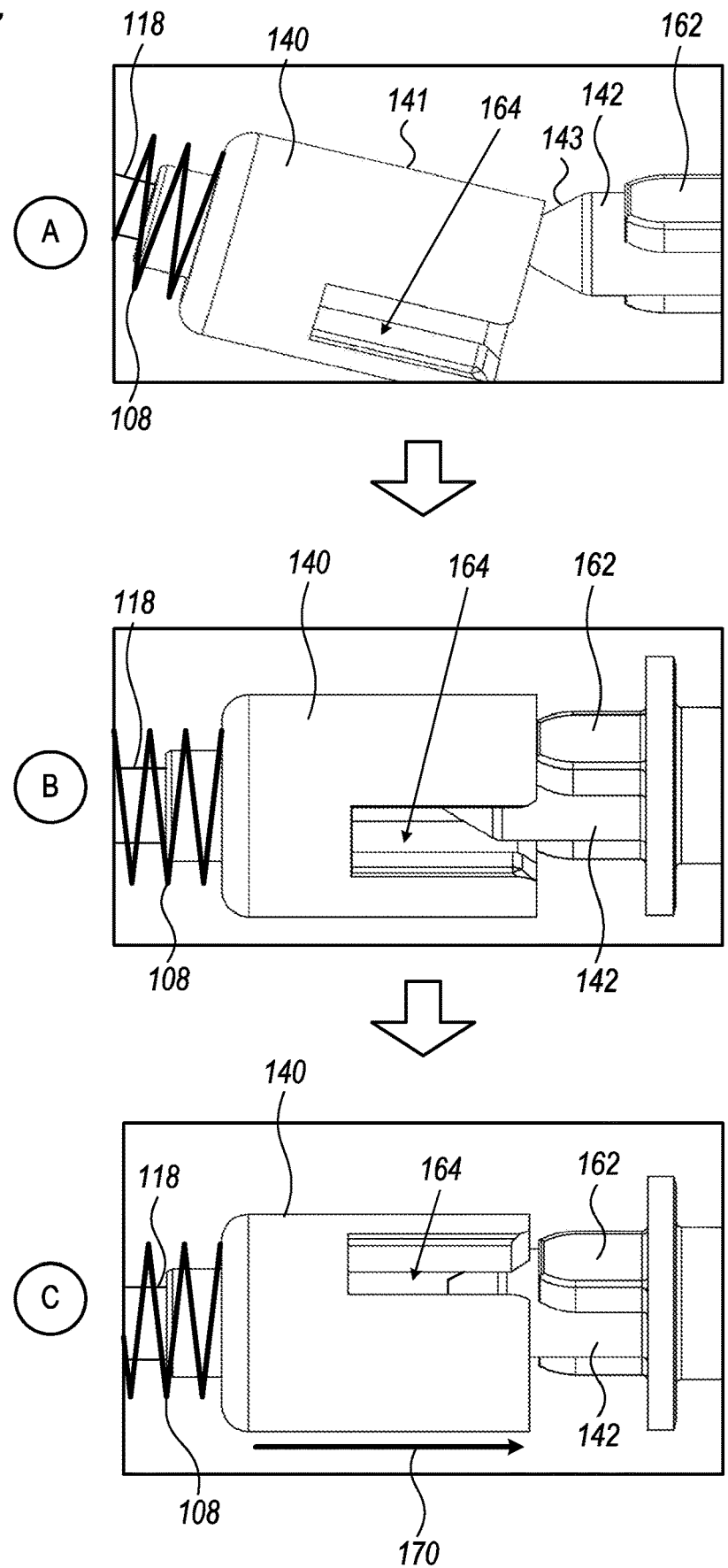
FIG. 7 shows a reversible coupling of a slidable connector to a proximal end of a rotor, in accordance with some examples of the present disclosure.

Reference is now made to FIG. 7, which shows a reversible coupling of a slidable connector to a proximal end of a rotor, in accordance with some examples of the present disclosure.

Step A of FIG. 7 depicts slidable connector 140 and proximal end 142 of the rotor as the cartridge is inserted into the base. By virtue of the downward tilt of the distal shaft being limited as described above with reference to FIG. 5, connector 140 and proximal end 142 are only slightly axially misaligned with one another. Hence, as the rotor approaches the distal shaft during the insertion, the proximal end of the rotor may enter the connector, thereby lifting the distal shaft into axial alignment with the rotor. Alternatively, the connector may enter the proximal end of the rotor, such that the proximal end of the rotor lifts the distal shaft into axial alignment.

For example, as shown in FIG. 7, the slidable connector may be shaped to define a receptacle 141, the proximal end of the rotor may include a tapered protrusion 143, and the distal shaft may become axially aligned with the rotor by virtue of tapered protrusion 143 entering receptacle 141. Alternatively, the proximal end of the rotor may be shaped to define a receptacle, the slidable connector may comprise a tapered protrusion, and the distal shaft may become axially aligned with the rotor by virtue of the tapered protrusion entering the receptacle.

Step B of FIG. 7 depicts slidable connector 140 and proximal end 142 of the rotor immediately following the insertion of the cartridge. At this point in time, the distal shaft and connector 140 are axially aligned with the rotor. However, the connector is not necessarily rotationally aligned with proximal end 142. By virtue of the rotational misalignment, the connector cannot yet reversibly couple to proximal end 142; rather, the rotor pushes the slidable connector proximally, thereby compressing spring 108.

As shown in step C of FIG. 7, upon the motor rotationally aligning the slidable connector with the proximal end of the rotor (by rotating distal shaft 118), spring 108 decompresses. As the spring decompresses, the spring pushes the slidable connector distally, as indicated by an arrow 170, thereby reversibly coupling the slidable connector to the proximal end of the rotor. Thus, distal shaft 118 becomes mechanically coupled to the rotor, as shown in FIG. 6.

In general, slidable connector 140 and proximal end 142 may comprise any suitable coupling-enabling features for reversibly coupling these two elements to one another, with the "rotational alignment" of these two elements being defined with respect to these features. In other words, slidable connector 140 is said to be rotationally aligned with proximal end 142 when the coupling-enabling features of the slidable connector are aligned with the coupling-enabling features of proximal end 142.

For example, for embodiments in which proximal end 142 enters the slidable connector as shown in FIG. 7, proximal end 142 may comprise one or more (e.g., two) tabs 162 and the slidable connector may be shaped to define one or more (e.g., two) slits 164. Alternatively, for embodiments in which the slidable connector enters the proximal end of the rotor, the slidable connector may comprise one or more (e.g., two) tabs and the proximal end of the rotor may be shaped to define one or more (e.g., two) slits. Upon the slidable connector becoming rotationally aligned with the proximal end of the rotor—i.e., upon the slits becoming rotationally aligned with the tabs, or the tabs becoming rotationally aligned with the slits—the slidable connector reversibly couples to the proximal end of the rotor by virtue of the tabs entering the slits.

Reference is again made to FIG. 4.

Advantageously, mechanical coupling mechanism 53, which may comprise any suitable combination of gears, belts, and/or other components, may facilitate greater compactness of apparatus 28, by allowing greater flexibility in the placement of motors 32. For example, as shown in FIG. 4, motors 32 may be mostly or entirely distal to the proximal shafts. Thus, the base need not necessarily be much longer than the combined length of the cartridge and the assembly of shafts.

Although the present figures show examples comprising exactly two positive displacement pumps, it is noted that the scope of the present disclosure also includes examples comprising exactly one positive displacement pump or more than two positive displacement pumps. For example, cartridge 30 (FIG. 1) may comprise only a single rotor and stator, with base 50 comprising only a single motor. Alternatively, cartridge 30 may comprise more than two rotors and stators, with base 50 comprising the same number of motors. It is further noted that the coupling mechanism described with reference to FIGS. 6-7 may be used for any application (phacoemulsification-related or otherwise) in which a disposable progressive cavity pump is used, regardless of whether the pump is contained in a cartridge.

EXAMPLES

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An apparatus for mechanically coupling a motor (32) to a rotor (52) of a progressive cavity pump includes a proximal shaft (110) configured to mechanically couple to the motor, a proximal-middle universal joint (112), a middle shaft (114) coupled to the proximal shaft via the proximal-middle universal joint, a housing (166) shaped to define a bore (168), a middle-distal universal joint (116) disposed within the bore, a distal shaft (118) coupled to the middle shaft via the middle-distal universal joint, and a slidable connector (140) slidably disposed over the distal shaft and configured to reversibly couple to a proximal end (142) of the rotor. The bore is sized to limit a downward tilt of the distal shaft such that, as the rotor approaches the distal shaft, the distal shaft becomes axially aligned with the rotor by virtue of the proximal end of the rotor entering the slidable connector or the slidable connector entering the proximal end of the rotor. The apparatus further includes a compression spring (108) connected proximally to the slidable connector and distally to the middle-distal universal joint, and configured to decompress, thereby reversibly coupling the slidable connector to the proximal end of the rotor, subsequently to the distal shaft becoming axially aligned with the rotor, upon the motor rotationally aligning the slidable connector with the proximal end of the rotor.

Example 2

The apparatus according to Example 1, wherein a bore-diameter of the bore (168) is at least 0.5 mm greater than a joint-diameter of the middle-distal universal joint (116).

Example 3

The apparatus according to any one of Examples 1-2,
wherein the slidable connector (140) is shaped to define a receptacle (141),
wherein the proximal end (142) of the rotor (52) includes a tapered protrusion (143), and wherein the distal shaft (118) becomes axially aligned with the rotor by virtue of the tapered protrusion entering the receptacle.

Example 4

The apparatus according to Example 3,
wherein the proximal end (142) of the rotor (52) includes one or more tabs (162) and the slidable connector (140) is shaped to define one or more slits (164), and
wherein the slidable connector is configured to reversibly couple to the proximal end of the rotor by virtue of the tabs entering the slits.

Example 5

The apparatus according to any one of Examples 1-2,
wherein the proximal end (142) of the rotor (52) is shaped to define a receptacle,
wherein the slidable connector (140) includes a tapered protrusion, and
wherein the distal shaft (118) becomes axially aligned with the rotor by virtue of the tapered protrusion entering the receptacle.

Example 6

The apparatus according to Example 5,
wherein the proximal end (142) of the rotor (52) is shaped to define one or more slits and the slidable connector (140) includes one or more tabs, and
wherein the slidable connector is configured to reversibly couple to the proximal end of the rotor by virtue of the tabs entering the slits.

Example 7

A method includes inserting a cartridge (30), which includes a progressive cavity pump including a rotor (52), into a base (50) including a motor (32), a proximal shaft (110) mechanically coupled to the motor, a proximal-middle universal joint (112), a middle shaft (114) coupled to the proximal shaft via the proximal-middle universal joint, a housing (166) shaped to define a bore (168), a middle-distal universal joint (116) disposed within the bore, a distal shaft (118) coupled to the middle shaft via the middle-distal universal joint, a slidable connector (140) slidably disposed over the distal shaft, and a compression spring (108) connected proximally to the slidable connector and distally to the middle-distal universal joint. The bore is sized to limit a downward tilt of the distal shaft such that, as the rotor approaches the distal shaft, the distal shaft becomes axially aligned with the rotor by virtue of a proximal end (142) of the rotor entering the slidable connector or the slidable connector entering the proximal end of the rotor. As the motor turns the proximal shaft, the compression spring decompresses, subsequently to the distal shaft becoming axially aligned with the rotor, upon the motor rotationally aligning the slidable connector with the proximal end of the rotor, thereby reversibly coupling the slidable connector to the proximal end of the rotor, and the rotor rotates eccentrically, subsequently to reversibly coupling to the slidable connector, by virtue of the proximal-middle universal joint and middle-distal universal joint. The method further includes, subsequently to the rotor rotating, ejecting the cartridge from the base.

Example 8

The method according to Example 7, wherein a bore-diameter of the bore (168) is at least 0.5 mm greater than a joint-diameter of the middle-distal universal joint (116).

Example 9

The method according to any one of Examples 7-8,
wherein the slidable connector (140) is shaped to define a receptacle (141),
wherein the proximal end (142) of the rotor (52) includes a tapered protrusion (143), and
wherein the distal shaft (118) becomes axially aligned with the rotor by virtue of the tapered protrusion entering the receptacle.

Example 10

The method according to Example 9,
wherein the proximal end (142) of the rotor (52) includes one or more tabs (162) and the slidable connector (140) is shaped to define one or more slits (164), and
wherein the slidable connector reversibly couples to the proximal end of the rotor by virtue of the tabs entering the slits.

Example 11

The method according to any one of Examples 7-8,
wherein the proximal end (142) of the rotor (52) is shaped to define a receptacle,
wherein the slidable connector (140) includes a tapered protrusion, and
wherein the distal shaft (118) becomes axially aligned with the rotor by virtue of the tapered protrusion entering the receptacle.

Example 12

The method according to Example 11,
wherein the proximal end (142) of the rotor (52) is shaped to define one or more slits and the slidable connector (140) includes one or more tabs, and
wherein the slidable connector reversibly couples with the proximal end of the rotor by virtue of the tabs entering the slits.

Example 13

The method according to any one of Examples 7-12, wherein the base (50) is shaped to define a slot (59), and wherein inserting the cartridge (30) into the base comprises inserting the cartridge into the base by sliding the cartridge through the slot.

It will be appreciated by persons skilled in the art that the present disclosure is not limited to what has been particularly shown and described hereinabove. Rather, the scope of the present disclosure includes both combinations and sub-combinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for mechanically coupling a motor to a rotor of a progressive cavity pump, the apparatus comprising:
   a proximal shaft configured to mechanically couple to the motor;
   a proximal-middle universal joint;
   a middle shaft coupled to the proximal shaft via the proximal-middle universal joint;
   a housing shaped to define a bore;
   a middle-distal universal joint disposed within the bore;
   a distal shaft coupled to the middle shaft via the middle-distal universal joint;
   a slidable connector slidably disposed over the distal shaft and configured to reversibly couple to a proximal end of the rotor,
   the bore being sized to limit a downward tilt of the distal shaft such that, as the rotor approaches the distal shaft, the distal shaft becomes axially aligned with the rotor by virtue of the proximal end of the rotor entering the slidable connector or the slidable connector entering the proximal end of the rotor; and
   a compression spring connected proximally to the slidable connector and distally to the middle-distal universal joint, and configured to decompress, thereby reversibly coupling the slidable connector to the proximal end of the rotor, subsequently to the distal shaft becoming axially aligned with the rotor, upon the motor rotationally aligning the slidable connector with the proximal end of the rotor.

2. The apparatus according to claim 1, wherein a bore-diameter of the bore is at least 0.5 mm greater than a joint-diameter of the middle-distal universal joint.

3. The apparatus according to claim 1,
   wherein the slidable connector is shaped to define a receptacle,
   wherein the proximal end of the rotor includes a tapered protrusion, and
   wherein the distal shaft becomes axially aligned with the rotor by virtue of the tapered protrusion entering the receptacle.

4. The apparatus according to claim 3,
   wherein the proximal end of the rotor comprises one or more tabs and the slidable connector is shaped to define one or more slits, and
   wherein the slidable connector is configured to reversibly couple to the proximal end of the rotor by virtue of the tabs entering the slits.

5. The apparatus according to claim 1,
   wherein the proximal end of the rotor is shaped to define a receptacle,
   wherein the slidable connector comprises a tapered protrusion, and
   wherein the distal shaft becomes axially aligned with the rotor by virtue of the tapered protrusion entering the receptacle.

6. The apparatus according to claim 5,
   wherein the proximal end of the rotor is shaped to define one or more slits and the slidable connector comprises one or more tabs, and
   wherein the slidable connector is configured to reversibly couple to the proximal end of the rotor by virtue of the tabs entering the slits.

* * * * *